(12) United States Patent
Nguyen Manh et al.

(10) Patent No.: US 9,672,498 B2
(45) Date of Patent: Jun. 6, 2017

(54) METHODS, SYSTEMS, AND COMPUTER READABLE MEDIA FOR MANAGING PERIODIC AIRCRAFT MAINTENANCE PLANNING PLANS

(71) Applicant: Airbus (S.A.S.)

(72) Inventors: Dang Nguyen Manh, Toulouse (FR); David Marty, Toulouse (FR); Gerald Bidault, Plaisance du Touch (FR); Massimiliano Di Santo, Blagnac (FR); Fabien Fleurey, Toulouse (FR)

(73) Assignee: AIRBUS (S.A.S.), Blagnac (FR)

( * ) Notice: Subject to any disclaimer, the term of this patent is extended or adjusted under 35 U.S.C. 154(b) by 94 days.

(21) Appl. No.: 14/715,269

(22) Filed: May 18, 2015

(65) Prior Publication Data

US 2016/0340057 A1 Nov. 24, 2016

(51) Int. Cl.
*B64F 5/00* (2017.01)
*G06Q 10/00* (2012.01)

(52) U.S. Cl.
CPC .................................. *G06Q 10/20* (2013.01)

(58) Field of Classification Search
CPC .. B64F 5/0045; G06Q 10/06; G06Q 10/06312; G06Q 10/20
See application file for complete search history.

(56) References Cited

U.S. PATENT DOCUMENTS

| | | | |
|---|---|---|---|
| 2010/0185475 A1* | 7/2010 | Holle | G06Q 10/04 705/7.23 |
| 2013/0073419 A1* | 3/2013 | Marwedel | B64F 5/0045 705/26.5 |
| 2014/0278638 A1* | 9/2014 | Kreuzkamp | G06Q 10/06398 705/7.15 |

* cited by examiner

*Primary Examiner* — Rodney Butler
(74) *Attorney, Agent, or Firm* — Jenkins, Wilson, Taylor & Hunt, P.A.

(57) ABSTRACT

Methods, systems, and computer readable media for managing periodic aircraft maintenance planning are provided. In some aspects, a method occurs at a maintenance platform server including a processor. The method includes providing one or more maintenance related object (MO), wherein each of the one or more MO represents one or more maintenance related task that includes criteria graphically depicted at an interface. In another aspect, the method further includes manipulating the criteria of the one or more maintenance related task represented by the one or more MO at the interface.

20 Claims, 14 Drawing Sheets

| TASK | TASK INTERVAL | GROUP |
|---|---|---|
| A | 750 FH | CHECK 0 |
| B | 1500 FH | CHECK 1 |
| C | 365 DAYS | CHECK 1 |
| D | 750 FC | CHECK 1 |

| TASK | TASK INTERVAL | GROUP |
|---|---|---|
| A | 750 FH | CHECK 0 |
| B | 1500 FH | CHECK 1 |
| C | 365 DAYS | CHECK 1 |
| D | 750 FC | CHECK 1 |
| E | 730 DAYS | CHECK 2 |
| F | 1095 DAYS | CHECK 3 |

604

| GROUP | GROUP INTERVAL | SERIES |
|---|---|---|
| CHECK 0 | 750 FH | |
| CHECK 1 | 12 MO | 12 MO |
| CHECK 2 | 24 MO | 12 MO |
| CHECK 3 | 36 MO | 12 MO |

| PREVIOUS PLANNING | | |
|---|---|---|
| TASK | TASK INTERVAL | GROUP |
| A | 750 FH | CHECK 0 |
| B | 1500 FH | CHECK 1 |
| C | 365 DAYS | CHECK 1 |
| D | 750 FC | CHECK 1 |
| E | 730 DAYS | CHECK 2 |
| F | 1095 DAYS | CHECK 3 |
| G | 730 DAYS | CHECK 2 |
| H | 3000 FH | CHECK 2 |

822

| PREVIOUS PLANNING | | |
|---|---|---|
| GROUP | GROUP INTERVAL | SERIES |
| CHECK 0 | 750 FH | |
| CHECK 1 | 12 MO | 12 MO |
| CHECK 2 | 24 MO | 12 MO |
| CHECK 3 | 36 MO | 12 MO |

FIG. 8B

830 UPDATED PLANNING

| TASK | TASK INTERVAL | GROUP |
|---|---|---|
| A | 750 FH | CHECK 0 |
| B | 1500 FH | CHECK 1 |
| C | 365 DAYS | CHECK 1 |
| D | 750 FC | CHECK 1 |
| E | 730 DAYS | CHECK 2 |
| F | 1095 DAYS | CHECK 3 |
| G | 1070 DAYS | CHECK 2 |
| H | 1700 FH | CHECK 2 |

832 UPDATED PLANNING

| GROUP | GROUP INTERVAL | SERIES | STATUS | COMPARISON |
|---|---|---|---|---|
| CHECK 0 | 750 FH | | VALIDATED | UNCHANGED |
| CHECK 1 | 12 MO | 12 MO | VALIDATED | UNCHANGED |
| CHECK 2 | 24 MO | 12 MO | TO BE EDITED | MODIFIED |
| CHECK 3 | 36 MO | 12 MO | VALIDATED | UNCHANGED |

FIG. 8C

METHODS, SYSTEMS, AND COMPUTER READABLE MEDIA FOR MANAGING PERIODIC AIRCRAFT MAINTENANCE PLANNING PLANS

TECHNICAL FIELD

The subject matter described herein relates to scheduled aircraft maintenance planning. More specifically, the subject matter relates to methods, systems, and computer readable media for managing periodic aircraft maintenance planning.

BACKGROUND

Typically, scheduled maintenance for aircrafts is based on organizing periodic tasks in a block check or equalized check maintenance plan in order to organize aircraft maintenance tasks, minimize aircraft downtime, and maximize aircraft maintenance facility resources. Fixed letter check maintenance plans have been widely used to master and simplify patterns of reoccurrences for tasks. For example, in a fixed letter check maintenance plan periodic tasks are classified as being one of an 'A check', 'B check', 'C check', or 'D check', based on their interval of recurrence. Such fixed letter check maintenance plans naturally reduce a number of task patterns, but this method lacks flexibility. Nowadays users wish to be able to tailor their maintenance plans according to usage parameters and maintenance strategies.

Most aircraft maintenance planning tools and platforms utilize a timeline display interface, where all recurrences of each maintenance task are represented as they are planned to occur. This allows visualizing when the next maintenance stops will take place and preparing the aircraft, aircraft operator, maintenance facility, etc., in the planning of the maintenance operations. However, display of tasks in this manner is much less suited for manipulating recurring tasks and control their periods and recurrences. Indeed, on a timeline, tasks of greatly varying intervals become intermixed, yet "cleansing" the timeline in order to display a smaller number of intervals is counterintuitive in such an interface.

Accordingly, a need exists for methods, systems, and computer readable media for managing periodic aircraft maintenance planning in order to provide a more intuitive interface that provides direct user interaction with maintenance tasks to reduce the variety of periodic recurrence intervals.

SUMMARY

Methods, systems, and computer readable media or infrastructure for managing periodic aircraft maintenance planning are disclosed. According to one aspect, a method occurs at a maintenance platform server including a processor. The method includes providing one or more maintenance related object (MO), wherein each of the one or more MO represents one or more maintenance related task that includes criteria graphically depicted at an interface, and manipulating the criteria of the one or more maintenance related task represented by the one or more MO at the interface.

According to another aspect, a system includes at least one processor and a maintenance platform server including at least one processor. The maintenance platform server of the system includes a management module configured to provide one or more maintenance related object (MO), wherein each of the one or more MO represents one or more maintenance related task that includes criteria graphically depicted at an interface, and manipulate the criteria of the maintenance related task represented by the one or more MO at the interface.

The subject matter described herein is implemented in software, in combination with hardware (non-specific or specific) and/or firmware, on which it runs. For example, the subject matter described herein is implemented in software executed by a processor. In one exemplary implementation, the subject matter described herein is implemented using a computer readable medium having stored thereon computer executable instructions that when executed by the processor of a computer control the computer to perform steps. Exemplary computer readable media suitable for implementing the subject matter described herein includes non-transitory devices, such as disk memory devices, chip memory devices, programmable logic devices, and application specific integrated circuits. In addition, a computer readable medium that implements the subject matter described herein is located on a single device or computing platform or is distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating an exemplary maintenance planning data structure according to an embodiment of the subject matter described herein;

FIG. 6B is a diagram illustrating an exemplary maintenance planning data structure according to an embodiment of the subject matter described herein;

FIGS. 8B-8C are diagrams illustrating exemplary maintenance planning data structures according to an embodiment of the subject matter described herein.

DETAILED DESCRIPTION

Figure 1:
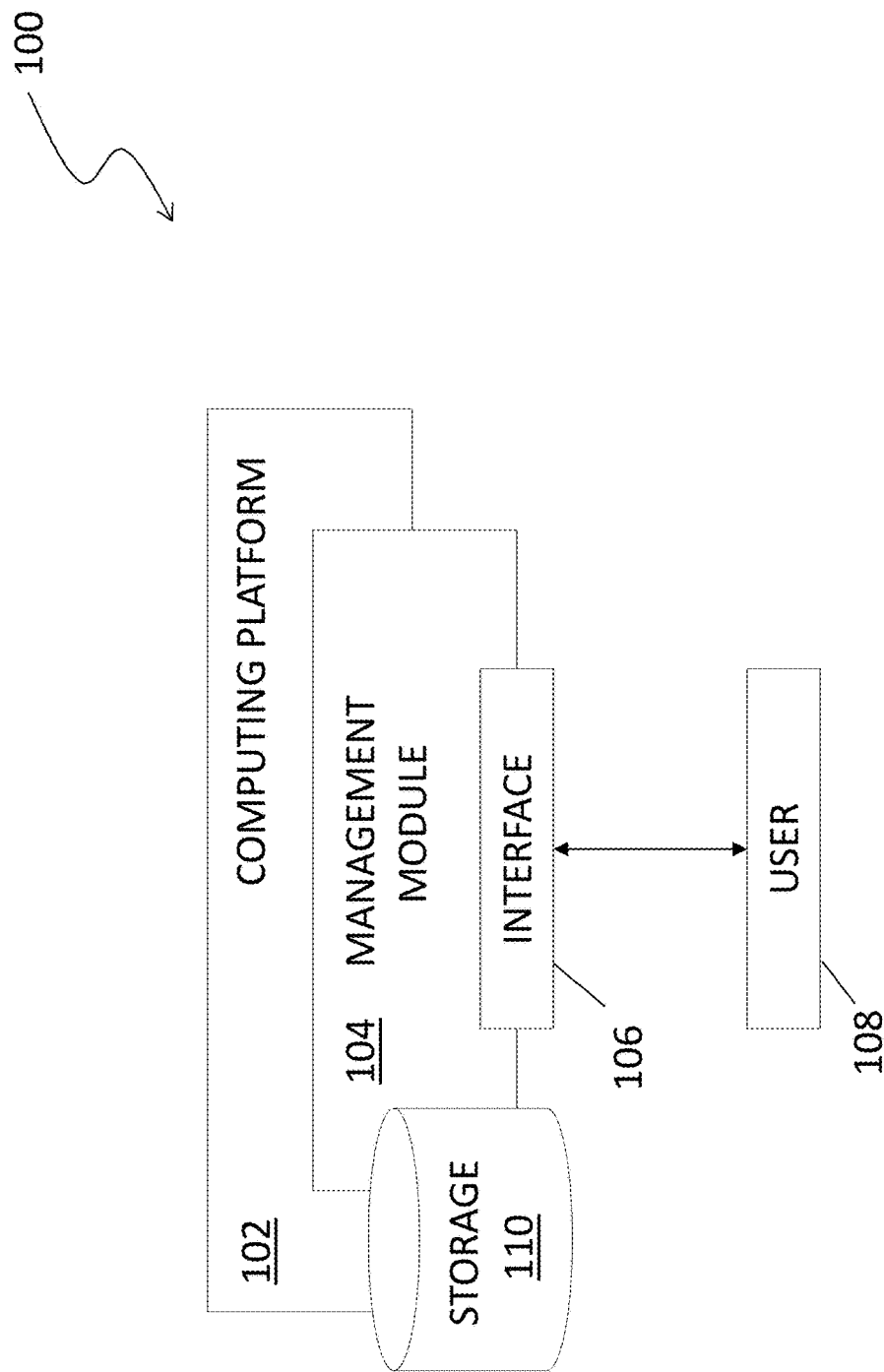
FIG. 1 is a diagram illustrating an exemplary computing platform for managing periodic aircraft maintenance planning according to an embodiment of the subject matter described herein.

The subject matter described herein discloses methods, systems, and computer readable media and/or infrastructure for managing periodic aircraft maintenance planning. When managing aircraft maintenance schedules or plans, it is desirable to reduce maintenance intervals of maintenance related tasks by manipulating the maintenance intervals such that there are fewer maintenance intervals in the aircraft maintenance schedule.

In accordance with some aspects of the subject matter described herein, a maintenance task is represented by a configurable object related to aircraft maintenance planning) displayed at a user interface. For example, a maintenance related object (MO) includes an aircraft maintenance task or a group of assigned maintenance tasks. In some aspects, a maintenance related task includes characteristics, attributes, and/or criteria. For example, each maintenance task includes an interval criterion, workload, duration, zone, initial criteria, etc. Thus, providing an MO comprises providing either an aircraft maintenance task or a group of assigned maintenance tasks each comprising individual characteristics or criteria.

In some aspects, one or more maintenance task is assigned to a group of maintenance tasks based on at least one similar criterion or attribute. Thus, in any given group of maintenance tasks there will be at least one common attribute. For example, several maintenance tasks all having a similar or approximately similar interval criterion are assigned to a group of maintenance tasks (e.g., 'CHECK 1'). In this example, tasks assigned to the group 'CHECK 1' all have an initial interval criterion within a specific delta (Δ) value of one another, while their actual interval criterion value, once assigned to the group, is the common value of the group—which must be equal or less than the lowest of each individual criteria of each task). The delta value is automatically assigned or is assigned by a user. The delta value is also subject to modification.

In some aspects, at least one of the criteria of the maintenance related tasks or group of maintenance related tasks represented by the MO is depicted at an interface. For example, an interval criterion of the tasks represented by the MO are graphically depicted at an interface in terms of Flight Hours (FH), Flight Cycles (FC), or calendar duration in days, months, etc. A conversion can be made between FH, FC, and calendar duration, depending on the usage parameters set for the aircraft (i.e., the amount of FC and FH it will fly over a certain period). For example, if the aircraft flies 1500 hours a year, with each flight lasting 2 hours, then 750 FH corresponds to 375 FC or 183 calendar days, and 12 months or 365 days corresponds to 750 FC and 1500 FH. Notably, an MO is related to more than one criteria type. For example, an MO is assigned a FH criterion of 750 FH and a calendar duration of 4 months—in which case the smaller criterion, upon conversion, takes priority. Notably, even if a conversion between two types of interval criterion is made, the initial type of interval criterion is stored for the task as the real usage of the aircraft can differ from the initially set parameter, thus affecting the actual conversion (at time of criterion triggering). In case an MO has more than one interval criterion, an initially non-dominant interval criterion becomes dominant (e.g., 750 FH will dominate 4 months, if the aircraft flies more than 2250 hours per year). Thus, maintenance related tasks or group of maintenance related comprising interval criterion of different types are configurable to be displayed together at an interface in a meaningful way (e.g., a first MO representing tasks comprising an interval criterion in terms of FC and a second MO representing tasks comprising an interval criterion in terms of days).

In some aspects, an MO is manipulated at the user interface. For example, one or more criterion of task(s) represented by an MO is/are manipulated at the user interface either by a user or automatically. In this example, the interval criterion of the task(s) represented by the MO is modified in order to merge or group the MO with at least a second MO representing tasks having a compatible interval criterion. Accordingly, by merging or grouping a maintenance related object with other maintenance related objects having compatible attributes the amount of maintenance intervals are reduced, which results in a reduction of maintenance related objects displayed at the interface.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary system, designated 100, comprising a computing platform 102 for planning periodic aircraft maintenance according to an embodiment of the subject matter described herein.

Computing platform 102 represents a network device, a network module, a node, or a system of devices, nodes, and/or modules. For example, computing platform 102 is, in one aspect, a server (e.g., maintenance platform server) that is capable of managing periodic aircraft maintenance tasks, supervision of aircraft systems, and communication with other actors. In some aspects, computing platform 102 is a single node or includes functionality distributed across multiple computing platforms or nodes.

Computing platform 102 in one aspect includes or accesses a management module (MM) 104. MM 104 represents any suitable entity or entities (e.g., a computing platform, software executing on a processor, etc.) for performing one or more aspects associated with managing periodic aircraft maintenance planning. For example, computing platform 102 and/or MM 104 is configured to communicate with various nodes and/or databases 110 in order to provide at an interface 106 at least one maintenance related object (MO). In another example, the MO is configured to be manipulated at interface 106. Further functionality of computing platform 102 and/or MM 104 is discussed in greater detail below.

In one aspect, computing platform 102 and/or MM 104 is configured to access a database or storage 110 storing aircraft maintenance planning data in order to retrieve maintenance task(s) related to a specific aircraft to generate a maintenance related object (MO) or in response to a query. Additionally, storage 110 is configured to store any modifications made to the stored data. Such maintenance related tasks include tasks, services, expected repairs, etc. required of a specific aircraft based on guidelines published by airworthiness authorities (e.g., Federal Aviation Administration (FAA), European Aviation Safety Agency (EASA), etc.). Each maintenance related task has associated criteria or characteristics that are also stored in storage 110 including interval criterion, workload, duration, zone, initial criteria, etc. Notably, each maintenance related task has at least one interval criterion corresponding to the periodic reoccurrence of the maintenance required for a specific aircraft. Thus, storage 110 represents any suitable entity (e.g., a non-transitory computer readable medium or a memory device) for storing data associated with periodic aircraft maintenance schedules, maintenance facility information, aircraft standards as determined by airworthiness authorities, etc. Exemplary data stored at storage 110 includes maintenance related tasks, characteristics associated with each maintenance related task, aircraft information, maintenance facility information, etc.

In some aspects, storage 110 is integrated with or accessible by MM 104, computing platform 102, or modules therein. In some aspects, storage 110 is located at a node distinct from MM 104 and/or computing platform 102. For example, storage 110 is associated with a storage device separate from computing platform 102.

In some aspects, storage 110 comprises either a single database or multiple databases accessible by computing platform 102 and/or MM 104. For example, where storage 110 comprises multiple nodes or databases, a first data storage stores data relating to the maintenance related task, while a second data storage stores data relating to the associated interval criterion, assigned group, etc.

In some aspects, computing platform 102 and/or MM 104 includes functionality for displaying the at least one MO at an interface 106. Interface 106, in one aspect, is a screen and/or other display device configured to be interactive with users, systems, and/or nodes. Interface 106 in one aspect includes functionality to allow a user 108 (e.g., maintenance planner) to manipulate interface elements of interface 106, such as, for example, entering and manipulating text, graphs and/or objects, zooming in and/or out, toggling the display, etc.

Where MM 104 is implemented on a computing platform 102 that comprises a touch screen, a user 108 interacts with interactive user interface elements (not shown) displayed on interface 106 by direct contact (e.g., finger contact) on the part of user 108. Furthermore, computing platform 102, in one aspect, comprises a control device, such as a trackball or a touchpad (of the multi-touch variety or otherwise), that is linked to interface 106 and enables user 108 to control movement of a cursor on interface 106 in order to act on the interactive user interface elements. Alternatively, computing platform 102, in one aspect, only comprises a control device and is not configured for direct contact by user 108 on interface 106.

Accordingly, after accessing aircraft scheduling information from databases or storage (e.g., storage 110), computing platform 102 and/or MM 104 is configured to display the aircraft scheduling information at interface 106. For example, where maintenance related tasks and associated characteristics are accessed from storage 110, MM 104 provisions the maintenance related tasks at interface 106 in the form of maintenance related objects (MOs). In this example, each maintenance related task corresponds to one MO, although multiple maintenance related tasks are configured to be represented by one MO.

Optionally, one or more maintenance related task is assignable to a group of maintenance related tasks which interval criterion is a combination thereof. For example, an MO representing a maintenance related task comprising an interval criterion of 750 FH is configurable to be assigned to an MO representing several maintenance related tasks also comprising an interval criterion of 750 FH. A group of maintenance related tasks grouped together and represented by a single MO is also known as a "maintenance event". Notably, when the MOs representing individual maintenance related tasks are first provisioned on interface 106 the MOs (e.g., individual tasks) are not assigned groups of any sort. For example, an algorithm that considers at least one criteria or characteristic of a maintenance related task, such as, e.g., interval criterion, workload, duration, zone, initial criteria, etc., is used to assign all maintenance related tasks to a specific group represented by an MO. Alternatively, a user manually provisions a maintenance related task to a group of maintenance related tasks having a same or similar criteria, the group being represented by an MO. In addition, tasks that have one or more characteristic (e.g., interval criterion) that is close, but not similar, are also grouped through algorithm(s) or manually. A user also manually groups tasks that have no same or close criterion, though this is not necessarily efficient. Notably, a maintenance related task need not be assigned to a group of maintenance related tasks, whatsoever. In that case, the specific maintenance related task is individually represented by an MO at interface 106.

In some aspects, computing platform 102 and/or MM 104 include functionality for manipulation of the MO and the characteristics associated with the maintenance related task(s) the MO represents. For example, an MO is configured to be manipulated by the user to be selected, configured, edited, modified, etc., in order to better synchronize and coordinate periodic maintenance related tasks. This will be discussed in greater detail, below, in reference to FIG. 3.

It should be noted that computing platform 102 and/or MM 104 and its components and functionality described herein constitute a special purpose computing device that improves the technological field of managing periodic aircraft maintenance schedules by manipulating interval criterion associated with a maintenance related task and represented by a maintenance related object, in order to reduce a number of maintenance related objects displayed on interface 106, and thereby better synchronize and coordinate periodic aircraft maintenance schedules.

Referring to FIG. 2, a maintenance planning data structure 200 is illustrated, which comprises any suitable data structure for storing maintenance related tasks and associated characteristics (e.g., interval, group, etc.). For example, maintenance planning data structure 200 is stored in a data table, where each line of the table corresponds to a maintenance related task and its associated interval and group. Notably, maintenance planning data structure 200 is modifiable and is configured to include characteristics regarding series, status, etc.

In some aspects, the task is denoted as an indicator (e.g., numerical, alphabetic, symbolic, etc.). For example, the first line of maintenance planning data structure 200 comprises the data associated with maintenance related task 'A'. A more detailed descriptor of each actual task is also stored in data storage 110, although it is not stored in maintenance planning data structure 200. In some aspects, however, maintenance planning data structure 200 does store a more detailed descriptor of each actual task.

In some aspects, the interval of a maintenance related task is stored in maintenance planning data structure 200. An "interval" refers to a period or pattern of reoccurrence that the associated task need occur. For example, the interval of 'TASK A' is 750 flight hours (FH), indicating that every 750 FH 'TASK A' need be performed. The interval of a maintenance related task is measured in terms of flight hours (FH), flight cycles (FC), or calendar duration in days, months, etc. Each of FH, FC, and calendar duration is capable of being converted into a single unit base unit for display at an interface depending on aircraft's usage parameters. For example, supposing the aircraft would fly 1500 FH or 750 FC a year, at the first line of maintenance planning data structure 200, the interval criterion associated with 'TASK A' is 750 FH, which corresponds to 375 FC and 183 calendar days. At a second line of maintenance planning data structure 200, the interval criterion associated with 'TASK B' is 1500 FH, which corresponds to 750 FC and 365 calendar days. By comparison, at a third line of maintenance planning data structure 200, the interval criterion associated with 'TASK C' is 365 days, which corresponds to 750 FC and 1500 FH. In another comparison, at a fourth line of maintenance planning data structure 200, the interval criterion associated with 'TASK D' is 750 FC, which corresponds to 1500 FH and 365 days. Thus, maintenance tasks having interval criterion of different types (e.g., a 'TASK A' comprising an interval criterion in terms of FH, 'TASK C' comprising an interval criterion in terms of days, and a 'TASK D' comprising an interval criterion in terms of FC) are configurable to be stored, and subsequently displayed together at an interface, in a meaningful way, (see, e.g., FIG. 3).

In some aspects, the interval criterion stored in maintenance planning data structure 200 is used by computing platform 102 and/or MM 104 to generate MOs for display at interface 106. For example, computing platform 102 and/or MM 104 are configured to transmit to storage 110 or another storage device that is integrated with and/or accessible by MM 104, computing platform 102, or modules therein, a request message (e.g., characteristics query) regarding a maintenance related task and associated criteria information. In this example, storage 110 and associated storage devices are configured to access and retrieve interval criterion, as well as other criteria, for each task from maintenance planning data structure 200 and transmit a response message (e.g., characteristics answer) back to computing platform 102 and/or MM 104. Subsequently, MM 104 and/or computing platform 102 is/are provided with functionality to generate an MO representing a maintenance related task or tasks for display at interface 106.

In some aspects, a group that a maintenance related task is assigned to is stored in maintenance planning data structure 200. Notably, when a maintenance plan is first uploaded to storage 110 no maintenance related tasks are assigned to any group. However, an algorithm executed by computing platform 102 and/or MM 104 automatically organizes MOs into groups prior to being displayed at interface 106, and thus automatically assigns maintenance related tasks to a group in data structure 200. In the alternative, subsequently generating MOs from the maintenance related tasks stored at data structure 200 and displaying the MOs at interface 106 allows a user to manipulate and modify the MOs into groups.

In a possible implementation, a first MO is assigned to a group of MOs if the maintenance related task(s) represented by the first MO has at least one same criterion (e.g., interval criterion) in common with the maintenance related task(s) represented by the MOs in the group of MOs. For example, in maintenance planning data structure 200 'TASK B', 'TASK C', and 'TASK D' would be assigned to a same group, 'CHECK 1', while 'TASK A' is assigned to 'CHECK 0'. The maintenance tasks (i.e., 'TASK B', 'TASK C', and 'TASK D') assigned to 'CHECK 1' all comprise interval criterion that are equivalent, albeit they each comprise a different unit (e.g., FH, FC, day), while 'TASK A' comprises an interval criterion whose value differs from the interval criterion of the tasks assigned to 'CHECK 1'. Accordingly, each of the two different groups (e.g., 'CHECK 0' and 'CHECK 1') are provided for display at an interface (e.g., interface 106), as illustrated in FIG. 3, in the form of an MO.

In another embodiment, tasks are only grouped together if their main interval criterion is of the same nature.

In another embodiment, the automatically computed groups remain unnamed—they will only be named after human interaction in the interface.

Figure 3:
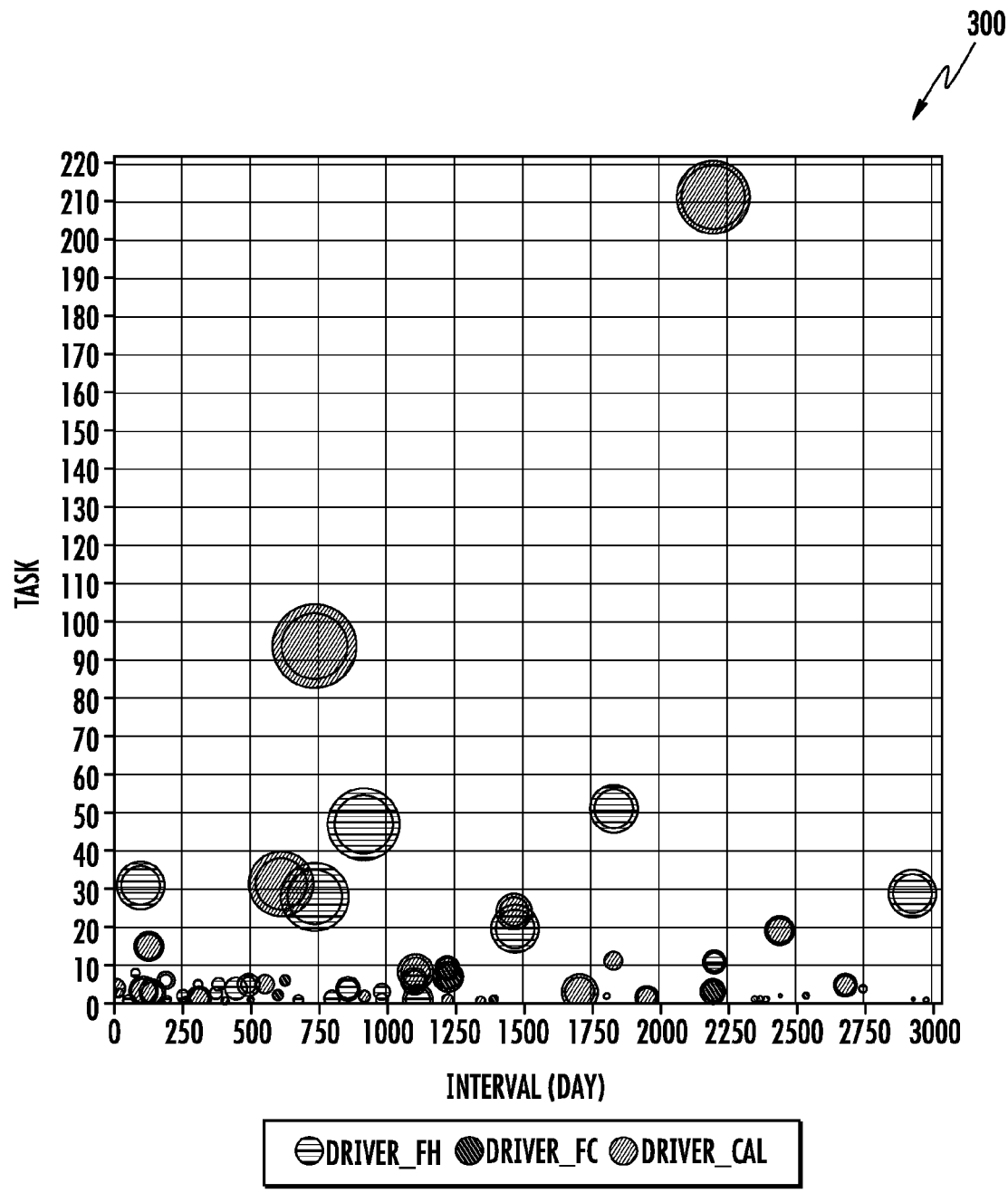
FIG. 3 is an exemplary screenshot of a graphical user interface according to an embodiment of the subject matter described herein.

Referring to FIG. 3, a screenshot 300 of interface 106 is illustrated and described herein. Screenshot 300 is illustrative of an exemplary graphical user interface (GUI) or display at interface 106 using data stored at maintenance planning data structure 200, accessible by computing platform 102 and/or MM 104. Graphical display 300 comprises an X-Y graph illustrating groups of maintenance related tasks and individual maintenance related tasks, each in the form of an MO generated by computing platform 102 and/or MM 104. Each MO is also displayed at coordinates of the graphical display. For example, in FIG. 3, the x-axis represents interval criterion, while the y-axis represents the number of tasks represented by each MO. A size of the MO also is representative of a dimension. For example, in FIG. 3, the size of the MO represents the workload in man hours required to complete all tasks represented by the MO. However, in some aspects, the size of each MO represents the number of tasks, the x-axis represents interval criterion, and the y-axis represents the workload.

At FIG. 3, each MO is displayed as a circle having a specific color and size. In other aspects, each MO is displayed as a shape different from a circle (e.g., a square, star, etc.). Different colors, sizes, and other defining motifs are also used to differentiate MOs having different characteristics from one another. These forms of differentiation are parameterized by a user (e.g., user 108) or by default. Still referring to FIG. 3, a size of the MO defines the workload or total man hours required to complete each of the task(s) represented by the MO. For example, the more man hours required to complete each task of the task(s) represented by an MO the larger the circle will be; the converse also being the case. A color of the MO corresponds to a unit type of the MO. For example, a MO with its interval criterion in flight cycles (FC) is represented as the darkest gray, in flight hours (FH) as the medium gray, and in calendar days (days) as the lightest gray. A key indicating what each color corresponds to is located at bottom of graphical display 300. Where the MO represents an individual maintenance related task having multiple interval criteria (e.g., 500 FH or 4 Months), the lower criteria is dominant and the location of the MO on graph 300 and the color of the MO will take on the value and the unit, respectively, of the lower criteria. Where the MO represents several maintenance related tasks, each having equivalent interval criterion of a different type (e.g., 'CHECK 1': 2000 FH, 1000 FC, and 365 days—with an aircraft flying 1500 FH and 750 FC per year) the calendar criteria is dominant and the location of the MO on graph 300 and the color of the MO will take on the value and the unit, respectively, of the calendar criteria.

A horizontal or 'x-axis' represents interval criterion of the MOs in terms of calendar days. In some aspects, an individual task comprises a periodic interval in which the task is to be accomplished.

A vertical or 'y-axis' represents a number of tasks represented by an MO, whether the MO is an individual task or a group of tasks. For example, where the MO represents an individual task, the MO will be located at a unit of '1' on the vertical axis. By comparison, where the MO represents a group of tasks, there being 50 tasks in that specific group, the MO will be located at a unit of '50' on the vertical axis.

Accordingly, each MO is represented on graphical display 300 in terms of workload, interval, and number of tasks per group.

Still referring to FIG. 3, each MO is configured to be selectable by user 108 to provide information about the selected MO. For example, by selecting an MO an automated query is sent to the related tables (e.g., maintenance planning data structure 200) and external databases and/or files (e.g., storage 110) to retrieve related information including metadata, such as, tooling, zones and/or access, maintenance configurations, tests, etc.) regarding each task represented inside the MO.

Figure 4A:
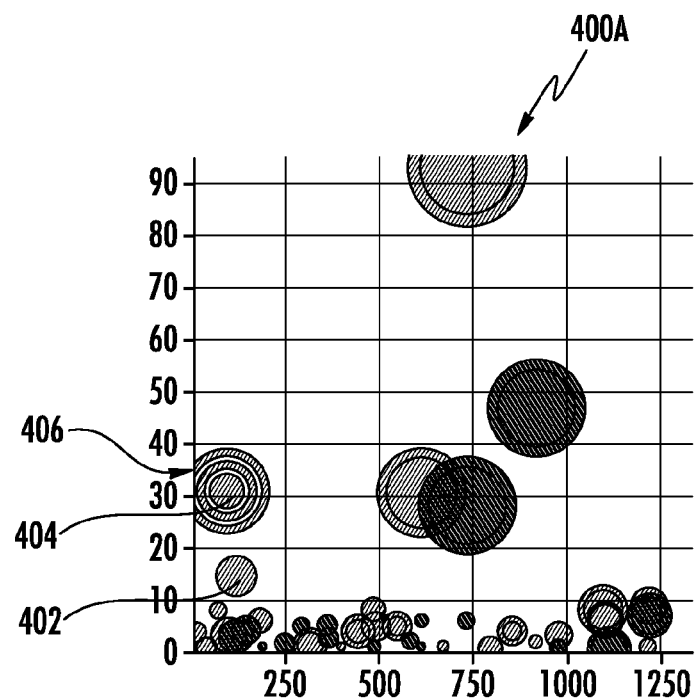
FIGS. 4A-4B are exemplary screenshots of graphical user interfaces according to an embodiment of the subject matter described herein.
Figure 4B:
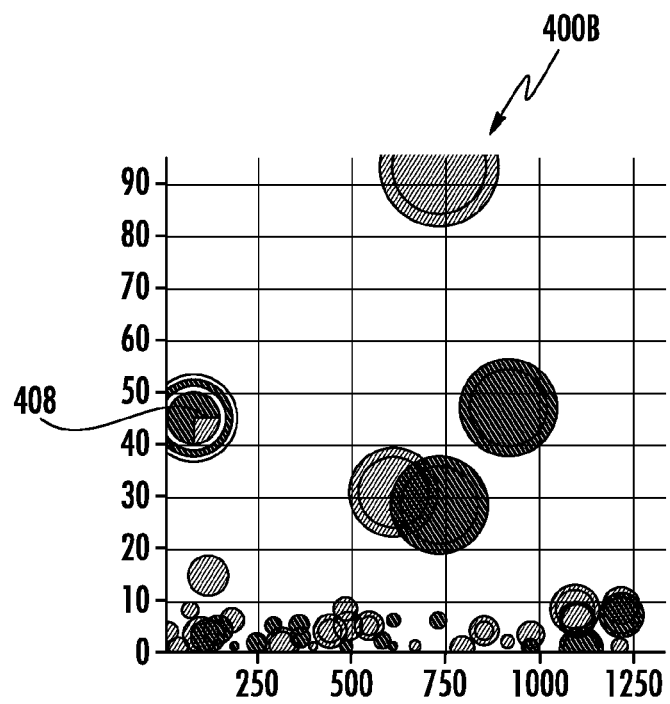

Referring to FIGS. 4A-4B, screenshots 400A-400B of interface 106 are illustrated and described herein. Screenshots 400A-400B are illustrative of an exemplary graphical user interface (GUI) or display 400A-400B at interface 106 where two MOs are manipulated by merging a first MO 402 into a second MO 406 in order to obtain a merged MO 408. For example, manipulating the MOs in this context refers to manipulating one of the characteristics or criteria of the maintenance related tasks represented by the MO. In reference to FIGS. 4A-4B, interval criterion of maintenance related tasks represented by first MO 402 are modified or edited and merged with second MO 406. Manipulating MOs in this manner advantageously results in fewer MOs displayed at interface 106, although each group of MOs will be larger because they contain more individual tasks, thereby improving the coordination and synchronization of the tasks required for scheduled aircraft maintenance.

At FIG. 4A, a first MO 402 and a second MO 406 are illustrated, along with a plurality of other MOs. In order to reduce the number of task intervals for tasks in an aircraft maintenance plan, maintenance related tasks comprising intervals that are similar are merged together through various approaches. In a first approach or "drag and drop" approach, the MOs are configured to be selected and dragged across a field of graphical display 400A. A control device (not shown) and/or direct interaction from user 108 are used to select and drag the MO to another MO where they merge. Notably, selecting, dragging, and/or merging an MO comprises doing so from "right to left", since interval criterion are reducible, but not increasable. For example, a first MO 402 is illustrated at an initial position that is farther right (i.e., has a higher interval criterion) than a second MO 406 that is farther left (i.e., has a lower interval criterion). An arrow A in FIG. 4A illustrates movement of first MO 402 as it is selected and dragged from the initial position to a second position illustrated by a transparent view of first MO 404 at the second position, which is farther left than the initial position. Alternatively, display 400A may not show the second position (i.e., transparent view) of first MO 402 after it has been selected and dragged, and, instead, may show first MO 402 hovering directly on the target MO (e.g., second MO 406) after it has been selected and dragged. In this example, since interval criterion are reducible, but not increasable, second MO 406 cannot be selected and dragged to the initial position of first MO 402, since that would require increasing an interval criterion of second MO 406. When the dragged element hovers near a compatible MO, symbols indicate the compatibility of the target MO. For example, in FIG. 4A when first MO 402 is selected and dragged to second MO 406, such that first MO 402 is hovering over second MO 406, concentric circles around second MO 406 indicate the compatibility of merging first MO 402 into second MO 406. In alternate embodiments, increasing an interval criterion of an MO is contemplated, as long as the interval criterion remains equal to or lower than the individual intervals of the tasks it contains.

In a second approach, groups of tasks are created through direct input from a user (e.g., user 108). For example, graphical display 400A includes interactive user interface elements (not shown) for defining a new group of tasks or "check" with an associated interval. In this example, user 108 specifies in a drop down menu box or other interactive user interface element (not shown) an interval value and unit (e.g., 750 FH), as well as a delta parameter ($\Delta$) (e.g., 250). The delta parameter $\Delta$ allows a user 108 to merge all nearby tasks that have an interval value between the specified interval value plus the delta parameter $\Delta$ to be merged into a new user defined check or group. For example, where first MO 402 comprises an interval of 185 days and is assigned to group 'CHECK 12' and second MO 406 comprises an interval of 750 FH, which is equivalent to 183 days and is assigned to group 'CHECK 11', user 108 defines a new group of tasks or a check having an interval value of 750 FH and a delta parameter $\Delta$ of 25 FH and a new defined check will include first MO 402 and second MO 406. Other approaches are also contemplated.

Regardless, using either of the first approach or the second approach, first MO 402 is merged into second MO 406. For example, FIG. 4B illustrates second MO 406 merged with first MO 402 to create a final object or merged MO 408. An intermediate screen or interactive user interface element (not shown) of interface 106 provides user 108 with the option of selecting from the task(s) represented by first MO 402 which tasks to be moved and/or merged with tasks represented by second MO 406 and which are to be left as being represented by first MO 402. Accordingly, not all tasks represented by first MO 402 need be manipulated to reduce the interval criterion. This provides greater customization for user 108. However, by default, all tasks of an MO are configured to be merged, unless otherwise specified. Once user 108 selects which tasks to merge to his or her own satisfaction, merged entity or merged MO 408 are subsequently displayed and first MO 402 and second MO 406 are removed from display 400A.

Once an MO is merged into a target MO, the tasks that are moved (e.g., interval is reduced) acquire the dominant criterion or (lower interval) of the tasks in the new check, as well as a new group or event name. For example, where first MO 402 is merged into second MO 406 to form MO 408, merged MO 408 comprises a dominant criterion of 750 FH equivalent to 122 days, and a new group (e.g., 'CHECK 11'). Therefore, merged MO 408 takes on the color of the dominant criterion. In FIG. 4B, this is the lighter gray, corresponding to FH. In one aspect, however, where the merged MO comprises tasks that have criteria of a type different than the dominant criterion (e.g., dominant criterion comprises days, while some tasks have criterion in the form of FC or FH) the proportion of those tasks comprising different types of criterion is graphically illustrated in merged MO in a pie chart depicted within a center of the merged MO, each type of criterion being represented by a color. For example, first MO 402 comprised interval criterion in terms of calendar days, while second MO 406 comprised interval criterion in terms of FH. Therefore, merged MO 408 has a dominant criterion of 750 FH equivalent to 183 days, but includes a percentage of how many tasks of the newly merged MO 408 include an interval in the form of days. According to merged MO 408, approximately 25% of the workload originates from maintenance tasks with calendar days as criteria (e.g., lightest gray), while 75% of the workload originates from tasks with FH as criteria (e.g., medium gray). For visual ease, the dominant criterion type (FH) is represented on the merged entity through a circle having a thickened border and surrounding the inner pie chart, the thickened circle corresponding in color (or any other demarcation) to the dominant criterion of the merged entity In FIG. 4B, for example, merged entity 408 comprises a dominant criterion of FH, such that a concentric circle having a thickened border of merged entity 408 is medium gray, which corresponds to FH. In addition, in comparison to the MOs that were merged to create the merged MO, the merged MO comprises a new graphical position on display 400B (due to higher number of tasks), as well as an increase in size due to the increased workload from the increased number of tasks the merged MO represents. For example, since the number of tasks merged MO 408 represents is more than the number of tasks second MO 406 represented prior to the merge with first MO 402, merged MO 408 comprises a new coordinate position with regard to the y-axis, although the interval criterion or position on the x-axis remains the same as second MO 406. Alternatively, a size of the merged entity is representative of the number of tasks (i.e., when the y-axis represents the workload, instead of the number of tasks).

Upon merging the tasks of two or more MOs to form a merged entity, the merged MO is then considered and confirmed as a "maintenance check". Confirmation of an MO as a maintenance check is depicted in the form of an additional, concentric circle surrounding the merged MO, as illustrated in screenshot 400B. This is contrary to automatically grouping maintenance events (e.g., in a fixed letter check maintenance plan), which does not always provide optimized maintenance events. For example, in FIG. 4B, merged MO 408 is confirmed and comprises a boundary encircling merged MO 408.

In addition, any manipulation to interval criterion or any other criteria of maintenance related task or tasks represented by an MO results in an automatic update of the database. For example, where interval criterion and the associated group corresponding to one or more tasks of first MO 402 are modified, a message request containing the updated interval criterion for those tasks (e.g., update message) is sent from computing platform 102 and/or MM 104 to storage 110. Storage 110 is then configured to update maintenance planning data structure 200 according to the information contained in the update message. Optionally, storage 110 is configured to send a response message (e.g., confirmation message) containing confirmation of the updated interval and group back to computing platform 102 and/or MM 104.

Figure 5A:
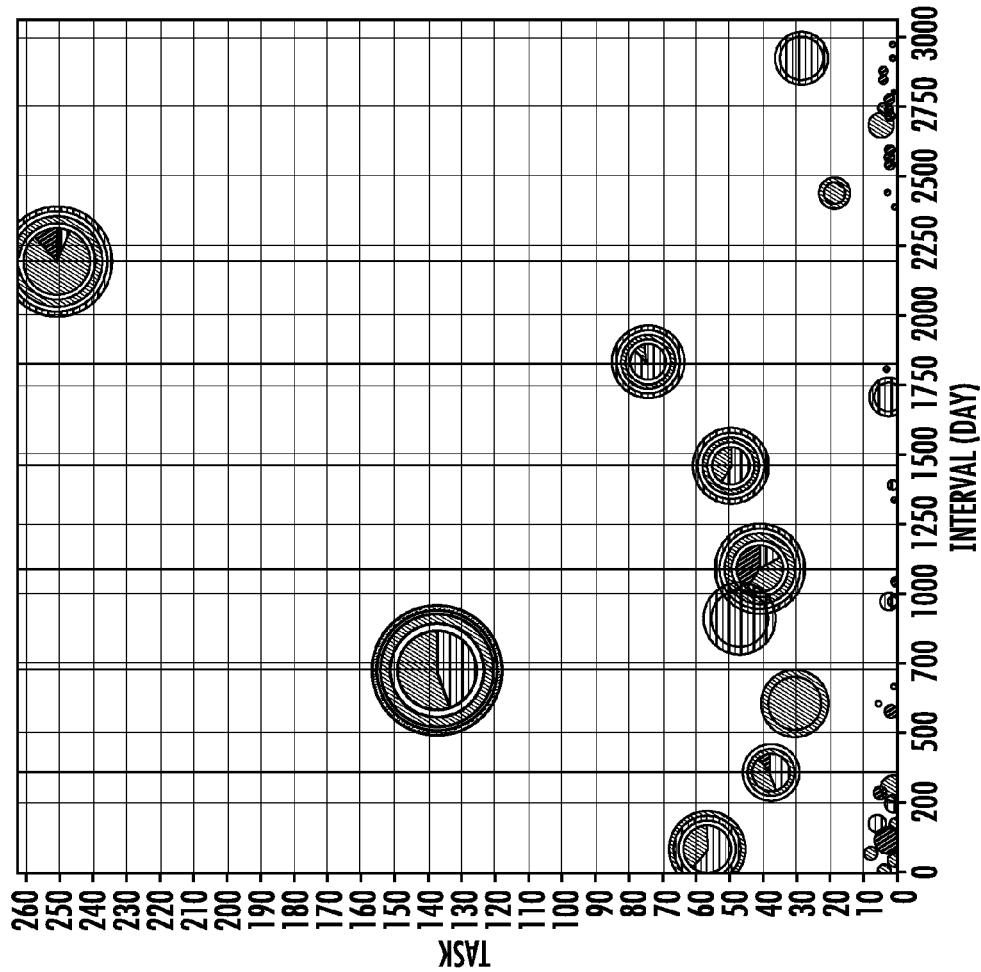
FIGS. 5A-5B are exemplary screenshots of graphical user interfaces according to an embodiment of the subject matter described herein.
Figure 5B:
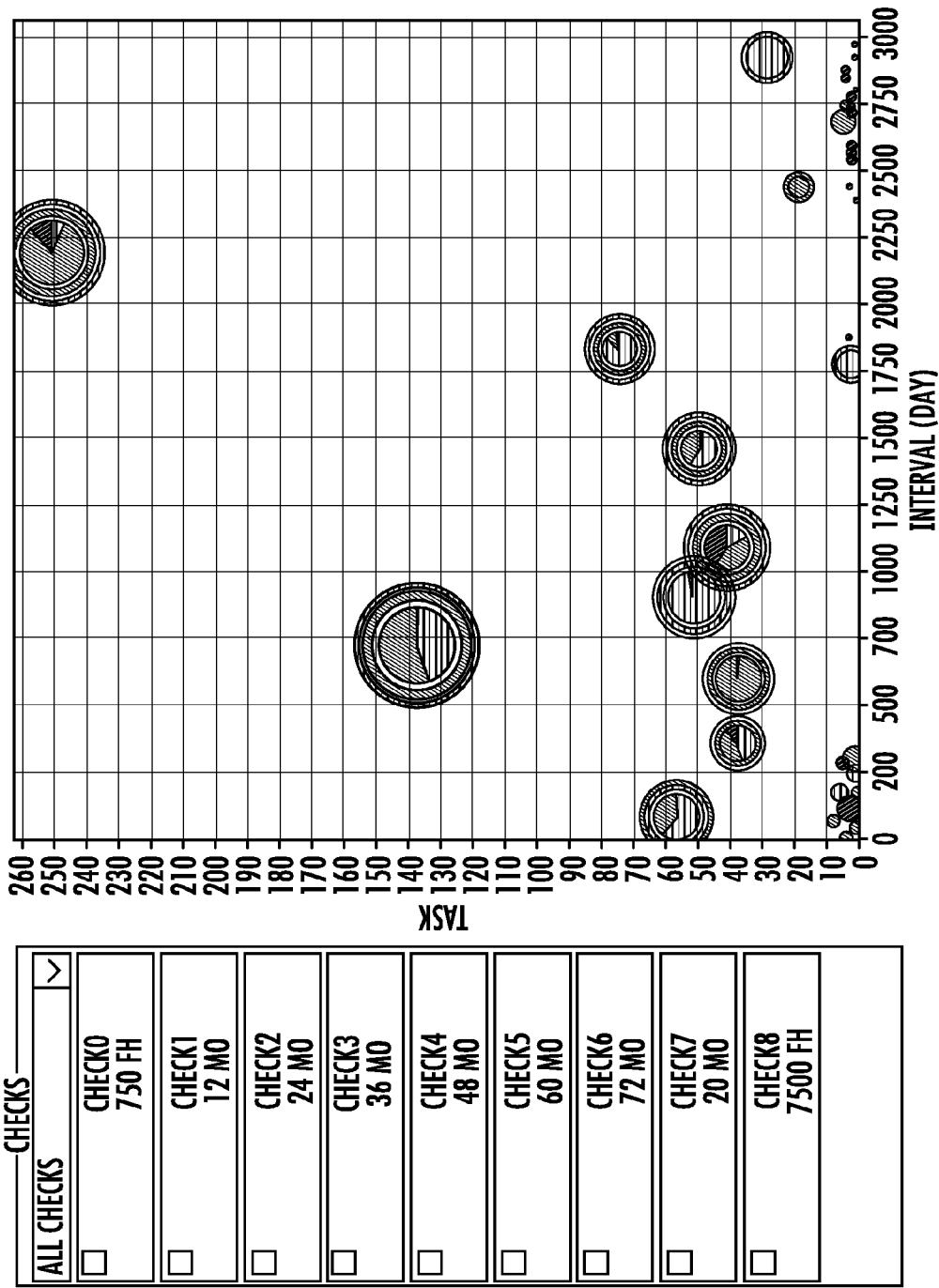

In one embodiment and in reference to FIGS. 5A-5B, existing MOs are merged together to form a merged MO or a new maintenance event, the new maintenance event being created based on multiples of a common interval criterion. For example, where multiple maintenance events comprise either interval dominant criterion of 500 FH or a multiple of 500 FH (e.g., 1000 FH, 1500 FH, 2000 FH, etc.), MOs representing maintenance related tasks comprising a dominant interval close to and compatible with the 500 FH criterion, or to one of the multiples thereof, are combined and merged into the maintenance event. In this manner, repetition patterns are advantageously consolidated, which is easier to manage and control for a user.

Referring to FIG. 5A, a screenshot 500A of interface 106 is illustrated and described herein. Screenshot 500A is illustrative of an exemplary graphical user interface (GUI) or display 500A at interface 106 where existing MROs are merged together to form new maintenance events based on multiples of a common interval criterion. Display 500A differs from display 400B in that more merged entities have been created to further "cleanse" the display. In addition, display 500A illustrates functionality for selecting a common interval criterion and multiples of the criterion in order to "cleanse" the display even more (e.g., merge MOs together). The common interval criterion is chosen for many reasons. For example, the common interval criterion is based off a determination (whether done automatically by computing platform 102 and/or MM 104 or manually by a user 108), what common interval criterion and its associated multiples is the most frequently occurring in the aircraft maintenance plan, whether it is considered valuable to group less frequently occurring criterion together, if there is an MO already including many maintenance tasks, if there is an MO with low workload but closely preceding an MO with more workload, etc. In display 500A, a common interval criterion of '12 MO' is selected, which corresponds to 'CHECK 1'.

In some aspects, the display is configured to provide a task bar for a user to manually define parameters regarding the dominant interval criterion, such as, for example, a number of repetitions of the interval criterion and a delta $\Delta$ value for which MOs having a larger interval within the delta value of the dominant interval criterion is merged into the dominant interval criterion or subsequent intervals. For example, in display 500A a task bar to the left of the graphical display is implemented for user 108 to manually define a delta $\Delta$ of '6' and a repetition value of '5', such that there is a dominant interval criterion of '12 MO' and five repetitions thereafter, each repetition occurring at 12 month intervals. Additionally, the delta $\Delta$ value of '6' indicates that any MOs with an interval criterion up to six months more than the dominant interval criterion (or a multiple thereof) is automatically merged into the event being created at that common interval.

In some aspects, in order for a user to better visualize which MOs are merged at each interval of the common interval criterion, vertical lines are displayed on screen 500A, one line corresponding to the common interval criterion and subsequent lines each corresponding to one multiple interval thereafter. Accordingly, there will be 1+n vertical lines, where '1' represents the line corresponding to the initial common interval criterion and 'n' represents the repetition value input. For example, on screen 500A, for example, there is a first vertical line at the dominant interval criterion at '12 MO' and n=5 subsequent vertical lines at '24 MO', '36 MO', '48 MO', '60 MO', and '72 MO', where the month values correspond to equivalent value in days. In this way, screen 500A acts as a preview screen, such that a user 108 can toggle with various inputs at the taskbar and visually observe the impact that a selection of a particular initial common interval criterion and subsequent parameters may have on the MOs currently displayed at interface 500A.

Once the common interval criterion and its parameters are selected, MOs that are positioned at the common interval criterion (or a multiple thereof), or that are larger yet within a specified delta $\Delta$ parameter, is merged into a new event at each common interval. For example, in FIG. 5A, where the selected common interval criterion is '12 MO' and the selected delta $\Delta$ value is '6' corresponding to '6 MO', then an MO having a dominant interval criterion of '12 MO' and an MO having a dominant interval criterion of '14 MO' is automatically merged into a new event created at the common interval criterion at '12 MO', while an MO having a dominant interval criterion of '25 MO' is automatically merged into a new event created at the common interval criterion at '24 MO'. Notably, however, an MO having a dominant interval criterion of '43 MO' will not be merged into the new event created at the common interval criterion of '36 MO' because '43 MO' is seven months, which is one month too large to be within the delta Δ value of '6 MO' from the previous interval, and '43 MO' cannot be merged into the new event created at the common interval criterion of '48 MO' because interval criterion cannot be increased.

In some aspects, these newly created and merged MOs are shown on a screen (e.g., 500A) for a preview. For example, the newly created and merged MOs are previewed in the form of a pie chart that includes a percentage of how many tasks of the newly merged MO are of each interval type (i.e., FH, FC, calendar duration). Additionally, for example, the merged MO takes on the color of the dominant interval criterion. The former MOs are then be hidden.

In some other aspects, the former MOs are made partially transparent instead of hidden.

Upon merging MOs into the new maintenance events created at the common interval, the merged MO include a visual of the contents of the merged together MOs, for example, in the form of a pie chart that includes a percentage of how many tasks of the newly merged MO are of each interval type (i.e., FH, FC, calendar duration). Additionally, the merged MO takes on the on the color of the dominant interval criterion. Referring to FIG. 5B, a screenshot 500B of an interface 106 is depicted, where screenshot 500B is illustrative of an exemplary graphical user interface (GUI) or display 500B at interface 106 where existing MOs have been merged into a new maintenance event created at a common interval criterion and at multiples of the common interval criterion, using the different techniques described above. As illustrated, a first event has been created at '12 MO' and is designated as 'CHECK 1', a second event has been created at '24 MO' and is designated CHECK 2', a third event has been created at '36 MO' and is designated 'CHECK 3', a fourth event has been created at '48 MO' and is designated 'CHECK 4', a fifth event has been created at '60 MO' and is designated 'CHECK 5', and a sixth event has been created at '72 MO' and is designated 'CHECK 6'. In addition, other events (e.g., 'CHECK 7' and 'CHECK 8') have been further created, independently from the "multiples" approach (they may have been built using "drag and drop", or by grouping tasks within a delta parameter, without computing multiples).

Once each new maintenance event is created at the initial common interval and multiple intervals thereof, and all appropriate MOs are merged into the new events, the resulting maintenance events are confirmed in the manner described above. For example, FIG. 5B illustrates display 500B where the new maintenance events at each common interval are confirmed and comprise an additional outermost concentric circle corresponding to confirmation of the event. Additionally, the vertical lines, as well as the merged MOs are removed from display 500B prior to or after confirmation. Notably, any MOs that were merged into a new maintenance event, or merged MO, results in an automatic update of the database. For example, where interval criterion and associated group, represented by one or more MOs, are modified in order to merge those MOs into a new maintenance event, computing platform 102 and/or MM 104 interface with storage 110 to update maintenance planning data structure 200.

Figure 6A:
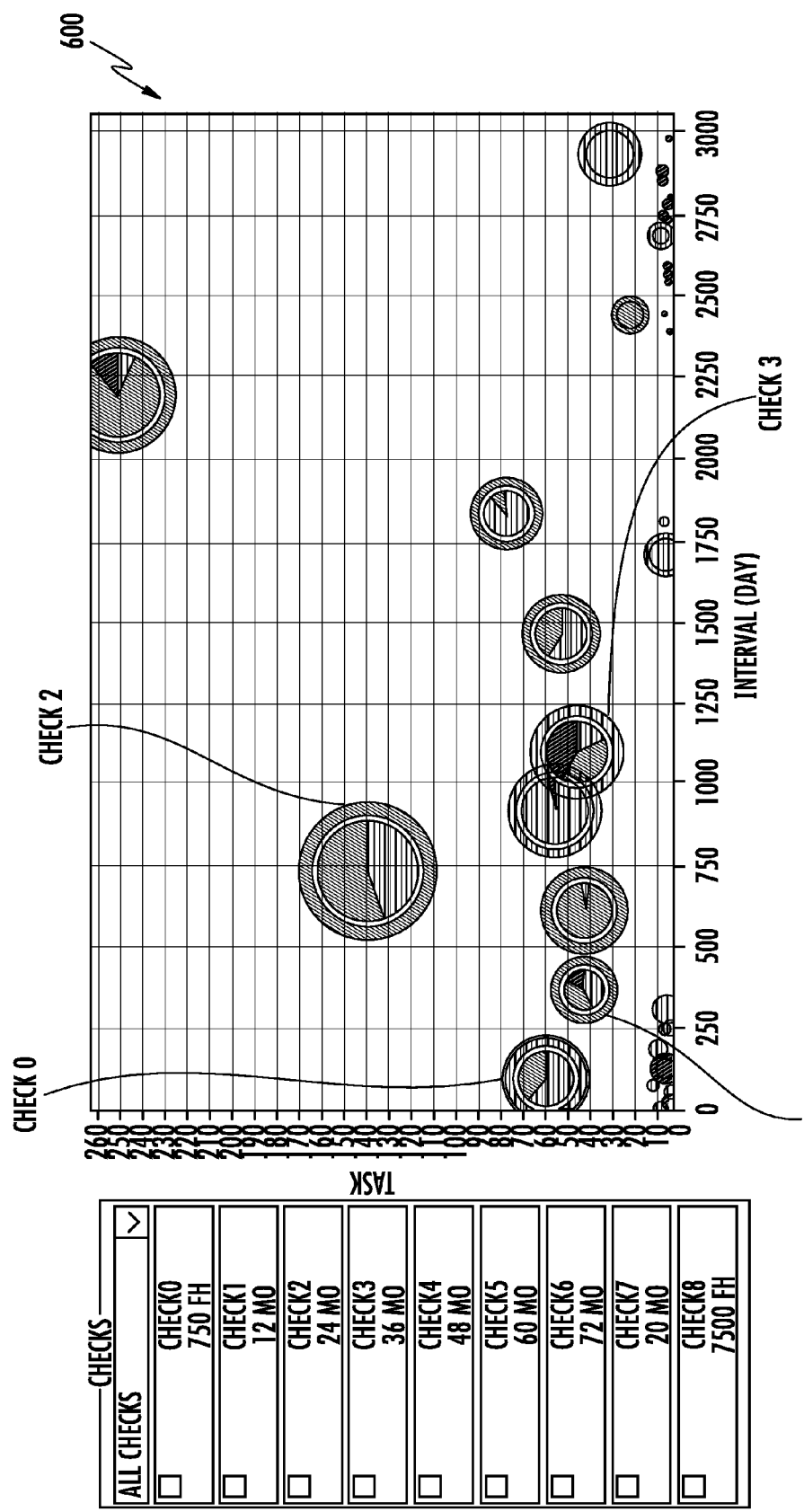
FIG. 6A is an exemplary screenshot of a graphical user interface according to an embodiment of the subject matter described herein.

In one embodiment and in reference to FIGS. 6A-6B, existing MOs (e.g., maintenance events, maintenance groups, individual tasks) having a common denominator are associated and further processed together. In this context, "associated" is defined as assigning a "group attribute" common to each existing MO to a "group series".

Referring to FIG. 6A, a screenshot 600 of interface 106 is illustrated and described herein. Screenshot 600 is illustrative of an exemplary graphical user interface (GUI) or display 600 at interface 106 where existing MOs having a common interval denominator are associated together in a group series. As used herein, a group series is a further grouping or categorization of maintenance related tasks, each group series having a "group attribute". The group attribute in this context is the common denominator shared by each member of the series. The common interval denominator is chosen based off a determination (whether done automatically by computing platform 102 and/or MM 104 or manually by a user 108). In FIG. 6A, for example, the interval criterion of '12 MO' and its associated multiples are '24 MO', '36 MO', '48 MO', '60 MO', '72 MO', etc., (i.e., each multiple has a lowest common denominator of 12 MO) are being selected as a series and assigned to a group series. In this example, the group attribute is '12 MO' since each MO being selected and assigned to the new group comprises maintenance related tasks having a common denominator of '12 MO'.

Notably, other interval criteria (other than '12 MO' in the above example) are configured to form a group series, even if not the most frequently occurring in the aircraft maintenance plan. Hence, multiple group series co-exist at the same display. For example, at display 600, a group series of '12 MO' and a group series of '20 MO' coexist.

In some aspects, a group series associated with any maintenance related task(s) is stored at a data structure. Referring to FIG. 6B, maintenance planning data structures 602 and 604 are illustrated, where maintenance planning data structures 602 and 604 include any suitable data structure for storing maintenance related tasks and associated characteristics (e.g., interval, group, series etc.) Maintenance planning data structure 602 extends maintenance planning data structure 200, while maintenance planning data structure 604 is a separate and/or distinct data structure. Alternatively, data structures 602 and 604 are combined into an expanded data structure.

Maintenance planning data structures 602 and/or 604 are stored in storage 110 and/or any other related storage modules. For example, maintenance planning data structure 602 is stored as a data table, where each line of the table corresponds to a maintenance related task and its associated interval and/or group, as illustrated in data structure 200. As a user manipulates the maintenance groups by creating new maintenance events, maintenance planning data structure 602 is correspondingly updated. Once maintenance planning data structure 604 is created and updated it contains information related to these maintenance events, such as their interval, and complements data structure 602 which contains the tasks (i.e., structure 602 refers to data structure 604 through the "group"). Maintenance planning data structure 604 is also stored as a data table, where each line of the table corresponds to the group and its associated group interval and/or series. Since data structures 602 and 604 are considered relational, any changes made to an attribute in either table automatically propagate to the either table, thus reducing any redundancy in the data. For example, as groups are assigned to a specific group interval and/or series, maintenance planning data structure 604 is automatically updated by the interaction at interface 106, such changes being automatically propagated to maintenance planning data structure 602.

In other embodiments, data structures 602 and 604 are implemented in other data forms, such as non-relational databases.

Still referring to data structure 604 in FIG. 6B, a maintenance group is assigned to a group interval. For example, 'CHECK 0' is assigned to '750 FH'. In reference to the example depicted in FIG. 5B, 'CHECK 1' is assigned to '12 MO', 'CHECK 2' is assigned to '24 MO', and 'CHECK 3' is assigned to '36 MO'. In addition, each group may or may not be assigned to a series. For example, 'CHECK 0' is not assigned to any series. However, 'CHECK 1', 'CHECK 2', and 'CHECK 3' all are assigned to the '12 MO' series. For purposes of clarity, 'CHECK 0' through 'CHECK 3' are visually represented and labeled in FIG. 6A. Thus, in this example, since each check corresponding to a maintenance event is assigned to series '12 MO', it follows that each check has a common interval denominator or group attribute of 12 months. In this manner, repetition patterns are advantageously consolidated for processing as one unit (e.g., '12 MO' series), which is more efficient for users.

In some embodiments, computing platform 102 and/or MM 104 is configured to implement a filter that modifies data and information displayed at interface 106. For example, MM 104 is configured to apply at least one filter to stored data with certain characteristics related to the contents of their tasks, such that the data to which a filter(s) is applied to are hidden, displayed, highlighted, etc. For example, maintenance related tasks having a specific interval criterion are hidden, displayed, highlighted, or otherwise manipulated by user (e.g., 108) interaction at an interface (e.g., 106). Additionally, computing platform 102 and/or MM 104 is configured to filter a current status of a maintenance related objected (MO), where a current status of the MO comprises at least, for example, whether or not it was assigned to a specific check, whether or not it is assigned to a series of checks, etc.

Figure 7A:
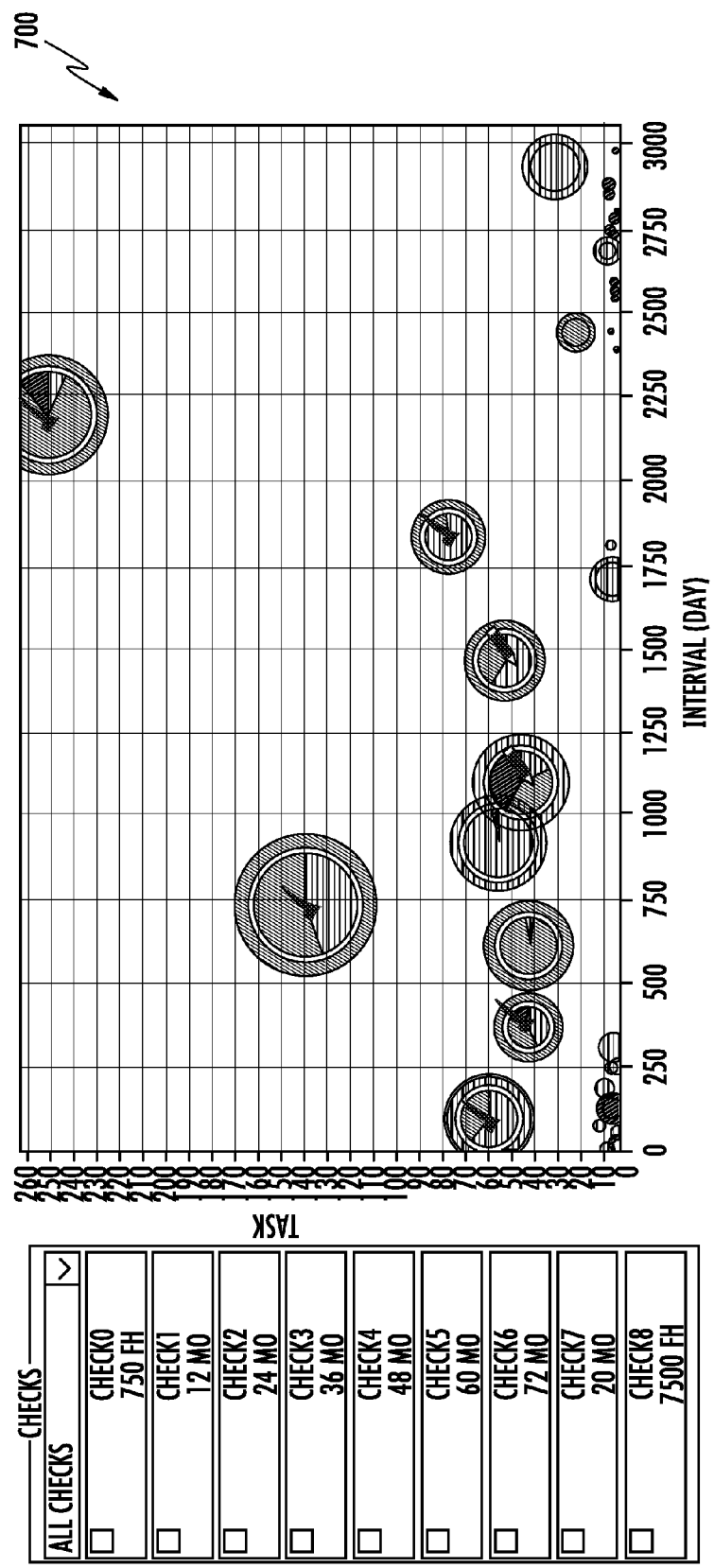
FIG. 7A is an exemplary screenshot of a graphical user interface according to an embodiment of the subject matter described herein.

In some embodiments, the interface is extended to cover a workflow, such that symbols indicate which MOs (e.g., maintenance events, maintenance tasks, etc.) are validated, are being edited, which have yet to be processed, etc. Referring to FIG. 7A, an exemplary screenshot 700 of interface 106 is illustrated and described herein. Screenshot 700 is illustrative of an exemplary graphical user interface (GUI) or display 700 at interface 106 where MOs are implemented in a workflow. For example, in FIG. 7A graphical display 700 illustrates MOs that are modified using attribute objects. In one aspect, attribute objects are used to represent whether an MO in a workflow is validated, edited, or yet to be processed. Symbols, letters, numerals, etc., or a lack thereof, are used to visually depict each attribute object. In this example, a check mark represents a validated MO, a pencil represents an edited MO, and a yet to be processed MO has no symbol. In other aspects, other symbols, letters, numerals, etc., or a lack thereof, are used to visually depict each attribute object.

Workflow actions occur at interface 106. To validate or edit an MO, each MO is configurable upon selection of the MO. For example, using a control mechanism (e.g., a mouse) or direct contact by a user, an MO is selectable and subsequently validated or modifiable through an interactive user interface element (not shown). Additionally, MOs in a workflow that have not been processed, are also be modifiable through an interactive user interface element to indicate that they will be processed, but have not yet.

Figure 7B:
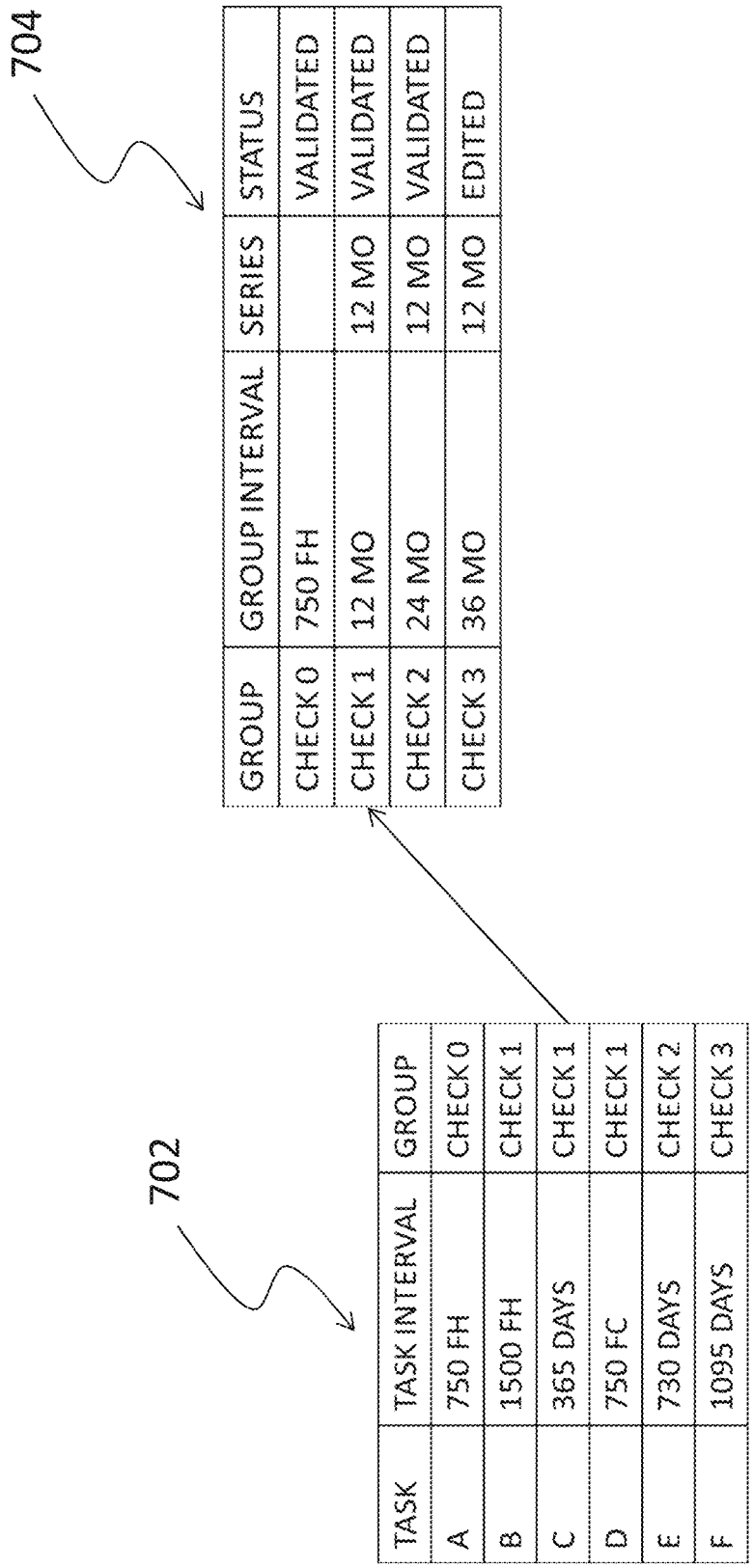
FIG. 7B is a diagram illustrating an exemplary maintenance planning data structure according to an embodiment of the subject matter described herein.

Depending on how an MO is modified at interface 106 (e.g., what workflow action is taken), maintenance planning tables 702 and 704 are automatically updated to indicate a status of the MO based on the workflow action taken. Referring to FIG. 7B, maintenance planning data structures 702 and 704 are illustrated, where maintenance planning data structure 702 includes any suitable data structure for storing maintenance related tasks and associated characteristics (e.g., interval, group) as illustrated in data structure 200. Thus, maintenance planning data structure 702 is related to maintenance planning data structure(s) 200 and/or 602 and is either integral to or distinct from these structures. As a user manipulates the maintenance groups by creating new maintenance events, maintenance planning data structure 702 is correspondingly updated. Once maintenance planning data structure 704 is created and updated it contains information related to these maintenance events, such as their interval and their current status in the workflow, and complements data structure 702 which contains the tasks (i.e., structure 702 refers to data structure 704 through the "group"). Maintenance planning data structure 704 is also stored as a data table, where each line of the table corresponds to the group and its associated group interval, series, and/or status. One or both of maintenance planning data structures 702 and 704 is stored in storage 110 and/or any other related modules.

Since data structures 702 and 704 are considered relational, any changes made to an attribute in either table automatically propagate to the either table, thus reducing any redundancy in the data. For example, as different workflow actions are taken at various maintenance events at an interface, maintenance planning data structure 704 is automatically updated by the interaction at interface 106, such changes being automatically propagated to maintenance planning data structure 702. In some aspects, when a status of an MO is updated (e.g., validated, edited, etc.) at interface 106 through workflow actions, maintenance planning data structure 704 is automatically updated, such changes propagating to data structure 702. For example, where 'CHECK 1' is validated through a workflow action at graphical display 700, maintenance planning data structure 704 is automatically updated to change the status of 'CHECK 1' to VALIDATED'; no changes needing to be propagated to data structure 702. In another example, rather than being validated, 'CHECK 3' is edited at data structure 704, such edit being visually represented by a pencil icon at display 700 in FIG. 7. Any changes (e.g., merging tasks of two MOs) made to 'CHECK 3' at data structure 704 is efficiently propagated to data structure 702.

In other embodiments, data structures 702 and 704 are implemented in other data forms, such as non-relational databases.

In some embodiments, the interface is configured to illustrate modification and/or manipulation of criteria of specific tasks due to updates and/or changes from the airline manufacturer, operator, maintenance planning database, etc., and a comparison of the previous planning to the new planning after modification. Where criteria regarding a specific task is updated or modified, the maintenance planning must also be updated (e.g., updating an interval, unmerging tasks from an event, etc.) to comply with the updated protocol.

In some aspects, for example, an initial interval criterion of a specific task is modified. When the initial criterion that is modified is an interval criterion of an already planned task several different outcomes can occur. In a first case, the new interval criterion is compatible by being within the grouping choices with the interval criterion of the group in which the task has already been assigned. For example, if 'TASK A' comprises a previous initial interval criterion of 365 days and is in the group 'CHECK 1' having a dominant interval criterion of '12 MO' and a delta Δ value of '2 MO', 'TASK A' remains compatible (and merged) with group 'CHECK 1' if the new initial criterion is up to two months larger than the dominant interval criterion of '12 MO' (i.e., 'TASK A' comprises a new initial interval criterion of up to 14 months). In such a case, the compatible task remains merged into the assigned group. In a second case, the new interval criterion is outside the grouping choices compared the interval criterion that has already been assigned. In this case, the task necessarily is ejected from the group it initially belonged to, and is assigned to a new group (or to an existing group which is compatible with it). For example, if 'TASK A' comprises a new initial interval criterion of '15 MO', then 'TASK A' is outside the grouping choices with its initially assigned group of 'CHECK 1' and must be unmerged from 'CHECK 1' and assigned to a new group in which it is compatible. Notably, even if the new initial interval criteria of the task is compatible with its initially assigned group, it may be beneficial to rework the already formed groups to create new groups that may be more optimized. In a third case, if the new interval criterion is smaller than the group's criterion to which it was assigned, it is incompatible with the group, itself, (as a task cannot belong to a group with a higher interval). In that case, the task is also ejected from the group, and must be assigned to a new group (or to an existing group which is compatible with it). For example, if 'TASK A' comprises a new initial interval criterion of '10 MO', then 'TASK A' is incompatible with its initially assigned group of 'CHECK 1' and must be unmerged from 'CHECK 1' and assigned to a new group in which it is compatible.

Figure 8A:
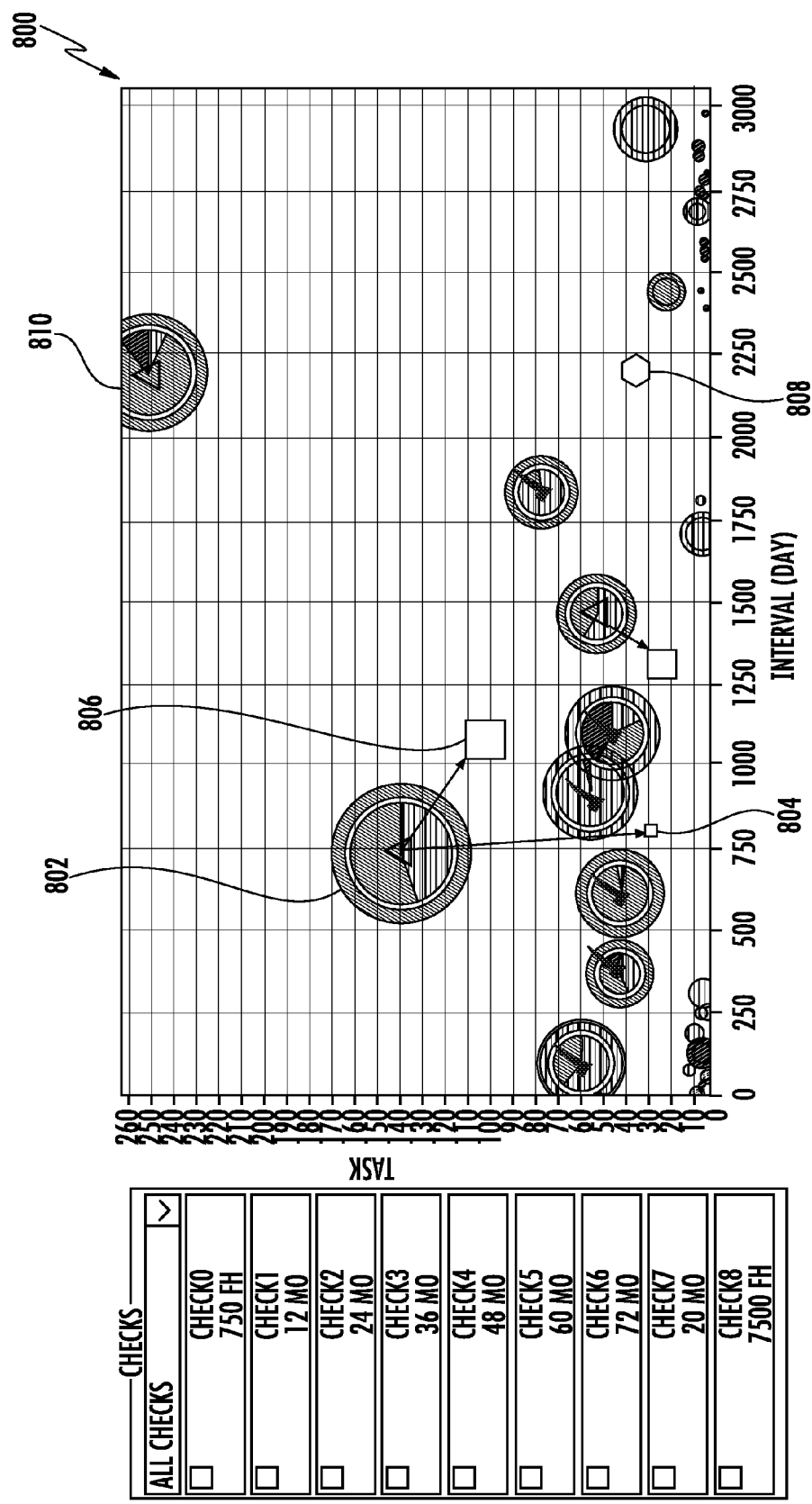
FIG. 8A is an exemplary screenshot of a graphical user interface according to an embodiment of the subject matter described herein.

As a result, where constraints of an initial criterion of a task have changed, there are two maintenance plannings: the previous planning, that was established with the former constraints and the planning being reworked, for which the constraints have changed. Accordingly, referring to FIG. 8A, a screenshot 8A of interface 106 is illustrated and described herein. Screenshot 800 is illustrative of an exemplary graphical user interface (GUI) or display 800 at interface 106 where an initial criterion of specific tasks have been modified, such tasks being represented by one or more MOs. Any changes made to the tasks results in changes to the maintenance planning visually represented in display 800. For example, FIG. 8A represents several MOs where individual task(s) are modified with a new initial interval criterion. A user (e.g., 108) can interact with interface 106 via interactive user interface elements (not shown) to select MOs and subsequently select specific tasks or groups of tasks represented by the MROs to modify interval criterion thereof.

After modification of the intervals associated with each task or groups of tasks, any tasks that are no longer compatible with their originally assigned groups are unmerged from the group and reassigned to an already existing group represented by an MO or are used to create a new maintenance event represented by a new MO on the interface at new coordinates (e.g., workload, number of tasks in group, interval criterion). For example, a maintenance event represented as MO 802 illustrates a group of maintenance related tasks, where two of the maintenance related tasks or a group of maintenance related tasks are modified so that each task's initial interval criterion is changed. In this example, MO 802 comprises a dominant interval criterion of '24 Months' and is assigned to group 'CHECK 2'. The newly formed MOs 804 and 806 in FIG. 8A are illustrated at graphical display 800 at their new dominant interval criterion in terms of days. In this example, MO 804 comprises one or more tasks with a new interval criterion of 27 Months and MO 806 comprises one or more tasks with a new interval criterion of 35 Months. Additionally, MO 804 represents 28 maintenance related tasks, while MO 806 represents 93 maintenance related tasks. Notably, the number of tasks and the workload associated with each of MOs 804 and 806 are smaller than what is represented by initial MO 802. In this manner, interface 800 is used to visually compare these two plannings, as it illustrates the modifications to the planning on the updated version.

In alternate embodiment (not shown), interface 800 illustrates two views for a comparison; more specifically, a version of the maintenance planning before interval constraints of a task or task(s) were updated, and a new version of the maintenance planning that is updated with these constraint modifications.

In some aspects, the initial MO from which tasks have been separated out is configured to include an object visually indicating that the change that has occurred at that MO. For example, a delta (Δ) symbol is depicted in a center of the initial MO 802 from which tasks were separated out. Additionally, an object symbol is depicted on an MO where tasks are deleted from the maintenance event or group, attributes of specific tasks have changed, etc., (see, e.g., 810).

By comparison, the MOs representing tasks separated from an initial MO and containing a modified interval criterion is configured to be represented through a symbol, numeral, color, size, shape, etc. in order to visually differentiate the newly formed MOs from the initial MO and identify the dominant interval criterion type. For example, the newly formed MOs 804 and 806 are each represented by a square, where MO 804 is shaded in medium gray as representing a dominant interval criterion type of flight hours (FH), while MO 806 is shaded in the lightest gray as representing a dominant interval criterion type of calendar days. These colors are in keeping with the color scheme of the rest of the MOs in the interface. In addition, a visual indicator linking each newly formed MO(s) to its initial MO is also depicted on the interface. For example, an arrow connecting initial MO 802 to newly formed MOs 804 and 806 is shown in graphical display 800.

Any completely new MOs (e.g., tasks that are imported from a database) are represented through a symbol, numeral, color, size, shape, etc., that is different from the symbol, numeral, color, size, shape, etc., representing the newly formed MOs separated out from an initial MO. For example, a new MO 808 is represented by a hexagon that is shaded in the lightest gray as representing a dominant interval criterion type of calendar days. By default, new MOs (e.g., 808) contain newly added maintenance related tasks that are automatically grouped together if they contain the same interval criterion, such that when one or more newly added maintenance related task comprises a same interval criterion as another maintenance related task, these tasks are represented as a group by an MO at the interface. For example, MO 808 represents 35 newly added maintenance related tasks, where each of these maintenance related tasks comprise an interval criterion of 72 Months. Notably, in order to visually depict tasks that are newly added to the aircraft maintenance plan, any newly added tasks with an associated interval criterion that is the same as an existing group of tasks, maintenance event, or individual maintenance task will still be represented as an individual MO. For example, MO 808 represents a newly imported maintenance group of tasks all having an interval criterion of 72 Months. MO 810 also comprises an interval criterion of 72 Months, however, for the sake of visually depicting updates to the aircraft maintenance plan, MO 808 is not merged with MO 810.

Accordingly, by selecting an MO at interface 800, an interactive user interface element is displayed to illustrate a status of the MOs of the current maintenance planning. For example, where tasks of various MOs are modified, a status symbol visually provides the status of those tasks of the MO, using the previous planning as a reference. Such symbols represent MOs comprising tasks that are unchanged, those for which an attribute (interval, workload, tools, etc.) has changed, those tasks that are deleted, those that are edited, etc. For example, and referring to FIG. 8B, when a user 108 selects MO 802, maintenance planning data structures 820 and 822 may be used to reference the previous planning in order to illustrate previous criteria associated with each task of that MO. Maintenance planning data structures 820 and 822 may be structured similarly to data structures 602 and 604, respectively, illustrated in FIG. 6B. In this example, 'TASK G' has an initial interval criterion of '730 DAYS' and 'TASK H' has an initial interval criterion of '3000 FH', such that both 'TASK G' and 'TASK H' are assigned to group 'CHECK 2' (i.e., MO 802). However, for whatever reason, the initial interval criterion of these tasks has been modified, as illustrated in FIG. 8C.

Updated or current interval criterion are included in current maintenance planning data structure(s), such as maintenance planning data structures 830 and 832. As discussed above, these data structures are configured to be able to propagate attribute changes to one another. These data structures may also provide a means of comparison of an MO that comprises task(s) that have updated criteria. Additionally, for example, and referring to FIG. 8C, maintenance planning data structures 830 and 832 may be used to reference the current planning and the current criteria associated with MO 802. FIG. 8C illustrates that 'TASK G' and 'TASK H' both have their initial interval criterion modified in comparison to FIG. 8B. 'TASK G' has new interval criterion of '1070 DAYS' while 'TASK H' comprises new interval criterion of '1700 FH', both of which are quite different from their previous, initial interval criterion.

In terms of a comparison between the previous planning data structures 820, 822 and the updated planning structures 830, 832 any updates to criteria and assigned groups made at the interface to various tasks will only update the updated planning structures 830, 832, while the previous maintenance planning structures 820, 822 remain the same. In some aspects, data structure 832 comprises a column indicating the result of a comparison between the previous planning data structures 820, 822 and the updated planning structures 830, 832. Using the previous example, 'CHECK 2' in data structure 832 is indicated as modified in comparison to data structure 822, since the interval criterion for 'TASK G' and 'TASK H' of group 'CHECK 2' has been modified.

Figure 9:
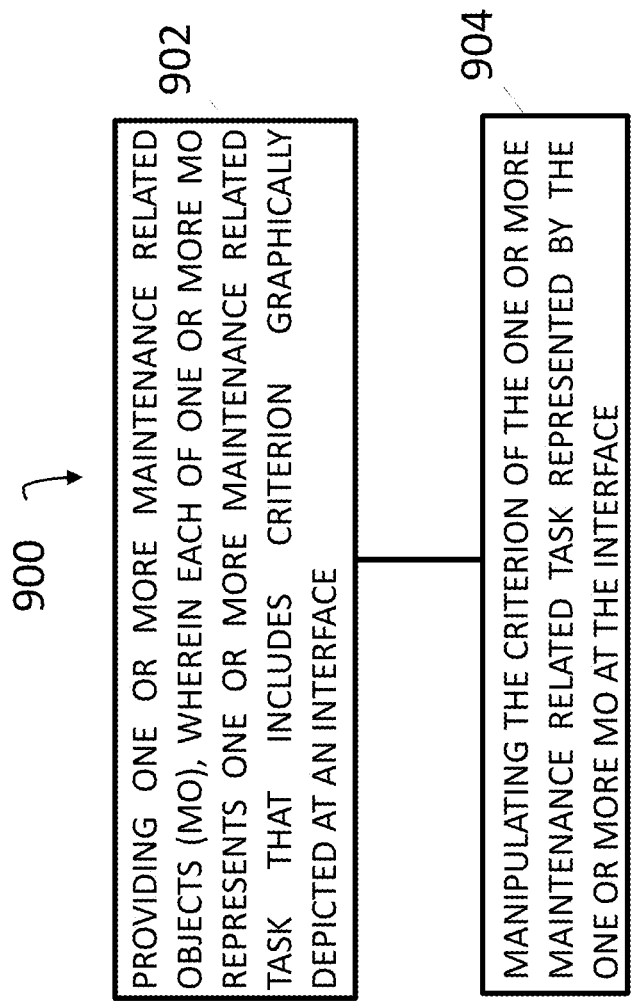
FIG. 9 is a diagram illustrating an exemplary process for managing periodic aircraft maintenance planning according to an embodiment of the subject matter described herein.

Storage 110 saves each version of the previous maintenance planning data structures for aircraft maintenance schedule history purposes, in which case a user is able to access the stored historical maintenance planning data structures. In some aspects, groups for which no task has changed and the groups have already been confirmed have a status of 'VALIDATED', whereas groups for which tasks have changed would have to be edited and may receive the status designation of 'TO BE EDITED'. Tasks that have been modified would have to be (re)assigned to a group, with similar methods as those discussed above Referring to FIG. 9, a diagram illustrating an exemplary process 900 for managing periodic aircraft maintenance planning according to an embodiment of the subject matter described herein is illustrated. In some aspects, the exemplary process, or portions thereof, are performed by or at a maintenance platform server including a computing platform 102, MM 104, and/or another node or module. In some embodiments, exemplary process 900 includes steps 902 and/or 904.

Referring to process 900, at step 902 one or more maintenance related object (MO) is provided at a maintenance platform server including at least one processor. Each of the one or more MO represents one or more maintenance related task that includes criteria graphically depicted at an interface. For example, an MO is provided at interface 106 associated with a maintenance platform server including computing platform 102 and/or MM 104.

At step 904, the criteria of the one or more maintenance related task represented by of the one or more MO is manipulated at the interface. For example, at least one of interval criterion, assigned group, assigned series, and status of one or more maintenance related tasks represented by the one or more MO is manipulated by modification at the interface 106.

It will be appreciated that exemplary process 900 is for illustrative purposes and that different and/or additional actions may be used. It will also be appreciated that various actions described herein may occur in a different order or sequence.

The subject matter described herein for managing periodic aircraft maintenance planning provides the ability for a user to manipulate and modify criteria associated with aircraft maintenance tasks that are represented by maintenance related objects at a user interface; thus reducing the number of maintenance related objects displayed at the interface. It should also be noted that a computing platform that implements subject matter described herein comprises a special purpose computing device (e.g., management module executed on a computing platform) usable to manage periodic aircraft maintenance planning.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:
1. A method for managing periodic aircraft maintenance planning, the method comprising:
   at a maintenance platform server including at least one processor:
      providing, by the at least one processor and via a graphical user interface, one or more maintenance related object (MO), wherein each of the one or more MO represents one or more maintenance related task that includes criteria graphically depicted at the graphical user interface, wherein the criteria includes an interval criterion corresponding to a periodic reoccurrence of the one or more maintenance related task;

manipulating, by the processor and based on user input, the criteria of the one or more maintenance related task represented by the one or more MO at the graphical user interface, wherein manipulating the criteria includes modifying the interval criterion of the one or more maintenance related task represented by the one or more MO; and adjusting, by the at least one processor, the graphical depiction of the one or more MO at the graphical user interface based on the manipulation.

2. The method of claim 1, wherein manipulating the criteria of the one or more MO at the graphical user interface comprises modifying at least one of group, series, and status of the one or more maintenance related task represented by the one or more MO.

3. The method of claim 1, wherein there are at least a first MO and a second MO each representing one or more maintenance related task that includes criteria graphically depicted at the graphical user interface, such that manipulating the criteria of the one or more maintenance related task comprises manipulating the criteria of the one or more maintenance related task represented by either the first or second MO at the graphical user interface.

4. The method of claim 3, wherein manipulating the criteria of the one or more maintenance related task represented by either the first MO or the second MO at the graphical user interface comprises assigning the one or more maintenance related task represented by either the first or second MO to a group of one or more maintenance related task represented by the other MO, and wherein all of the one or more maintenance related task represented by the first MO and the group of one or more maintenance related task represented by the second MO comprise a same interval criterion.

5. The method of claim 3, wherein manipulating the criteria of the one or more maintenance related task represented by either the first MO or the second MO at the graphical user interface comprises merging the first MO and the second MO into a merged MO at the graphical user interface.

6. The method of claim 5, wherein merging the first MO and the second MO into the merged MO comprises merging the MO representing the one or more maintenance related task comprising a larger interval criterion into the MO representing the one or more maintenance related task comprising a smaller interval criterion.

7. The method of claim 5, wherein merging the first MO and the second MO into the merged MO is based on the interval criterion of the one or more maintenance related task represented by the first MO and the interval criterion of the one or more maintenance related task represented by the second MO being within a delta parameter of each other.

8. The method of claim 5, wherein the merged MO represents one or more maintenance related task comprising a dominant interval criterion that is a smaller of the interval criterion of the one or more maintenance related task represented by either the first MO and the second MO.

9. The method of claim 5, further comprising associating the first MO and the second MO to a group series based on a common interval criterion of the one or more maintenance related task between the one or more maintenance related task represented by the first MO and the second MO.

10. The method of claim 1, further comprising updating a maintenance planning data structure stored in storage associated with the maintenance platform server when the criteria of one or more maintenance related task represented by the first MO is manipulated.

11. A system for managing periodic aircraft maintenance planning, the system comprising:
at least one processor; and
a maintenance platform server including the at least one processor, the maintenance platform server comprising:
a management module implemented using software executed by the at least one processor, wherein the management module is configured to provide, via a graphical user interface, one or more maintenance related object (MO), wherein each of the one or more MO represents one or more maintenance related task that includes criteria graphically depicted at the graphical user interface, wherein the criteria includes an interval criterion corresponding to a periodic reoccurrence of the one or more maintenance related task, manipulate the criteria of the maintenance related task represented by the one or more MO at the graphical user interface, wherein manipulating the criteria includes modifying the interval criterion of the one or more maintenance related task represented by the one or more MO; and adjust the graphical depiction of the one or more MO at the graphical user interface based on the manipulation.

12. The system of claim 11, wherein the management module is configured to modify at least one of group, series, and status of the one or more maintenance related task represented by the one or more MO.

13. The system of claim 11, wherein the management module is configured to provide at least a first MO and a second MO each representing one or more maintenance related task that includes criteria graphically depicted at the graphical user interface, such that manipulating the criteria of the one or more maintenance related task comprises manipulating the criteria of the one or more maintenance related task represented by either the first or second MO at the graphical user interface.

14. The system of claim 13, wherein the management module is configured to assign the one or more maintenance related task represented by either the first or second MO to a group of one or more maintenance related task represented by the other MO, and wherein all of the one or more maintenance related task represented by the first MO and the group of one or more maintenance related task represented by the second MO comprise a same interval criterion.

15. The system of claim 13, wherein the management module is configured to merge the first MO and the second MO into a merged MO at the graphical user interface.

16. The system of claim 15, wherein the management module is configured to merge the MO representing the one or more maintenance related task comprising a larger interval criterion into the MO representing the one or more maintenance related task comprising a smaller interval criterion.

17. The system of claim 15, wherein the management module is configured to merge the first MO and the second MO into the merged MO based on the interval criterion of the one or more maintenance related task represented by the first MO and the interval criterion of the one or more maintenance related task represented by the second MO being within a delta parameter of each other.

18. The system of claim 15, wherein the merged MO represents one or more maintenance related task comprising a dominant interval criterion that is a smaller of the interval criterion of the one or more maintenance related task represented by either the first MO and the second MO.

19. The system of claim 15, wherein the management module is configured to associate the first MO and the second MO to a group series based on a common interval criterion of the one or more maintenance related task between the one or more maintenance related task represented by the first MO and the second MO.

20. A non-transitory computer readable medium comprising computer executable instructions embodied in the computer readable medium that when executed by a processor of a computer perform steps comprising:

at a maintenance platform server including a processor:

providing, by the at least one processor and via a graphical user interface, one or more maintenance related object (MO), wherein each of the one or more MO represents one or more maintenance related task that includes criteria graphically depicted at the graphical user interface, wherein the criteria includes an interval criterion corresponding to a periodic reoccurrence of the one or more maintenance related task;

manipulating, by the processor and based on user input, the criteria of the one or more maintenance related task represented by the one or more MO at the graphical user interface, wherein manipulating the criteria includes modifying the interval criterion of the one or more maintenance related task represented by the one or more MO; and adjusting, by the at least one processor, the graphical depiction of the one or more MO at the graphical user interface based on the manipulation.

\* \* \* \* \*